United States Patent [19]

Bousquet et al.

[11]  4,206,044

[45]  Jun. 3, 1980

[54] CATALYTIC PROCESS FOR HYDRO-TREATING GAS OILS IN THE PRESENCE OF HYDROGEN

[75] Inventors: Jacques Bousquet, Irigny; Jean-René Bernard, Serezin du Rhone, both of France

[73] Assignee: Elf Union, Paris, France

[21] Appl. No.: 943,400

[22] Filed: Sep. 18, 1978

[30] Foreign Application Priority Data

Sep. 20, 1977 [FR] France .................................. 77 28321

[51] Int. Cl.² ............................................. C10G 23/04
[52] U.S. Cl. ..................................... 208/264; 208/217; 252/466 PT
[58] Field of Search ...................... 208/143, 217, 264; 260/677 H, 683.9

[56] References Cited

U.S. PATENT DOCUMENTS

| | | | |
|---|---|---|---|
| 3,790,504 | 2/1974 | Duhaut et al. | 208/143 |
| 3,836,453 | 9/1974 | Kovach et al. | 208/143 |
| 3,856,661 | 12/1974 | Sugier et al. | 208/143 |

*Primary Examiner*—Herbert Levine
*Attorney, Agent, or Firm*—Burgess, Ryan and Wayne

[57]  ABSTRACT

The invention is directed to a catalytic process for hydro-treating gas oils in order to improve their flow properties, the feed stock being treated at a temperature of between 400° and 550° C., under a total pressure of between 18 and 60 bars with a hydrogen/hydrocarbon molar ratio of between 2 and 8 in the presence of a catalyst comprising by weight from 0.1 to 1% of platinum and 0.01 to 1% of iridium deposited on an alumina support having a specific surface higher than 50 m²/g, a silica content of less than 10% weight and a halogen content of less than 0.1%.

8 Claims, No Drawings

CATALYTIC PROCESS FOR HYDRO-TREATING GAS OILS IN THE PRESENCE OF HYDROGEN

The invention is directed to a catalytic process for hydro-treating hydrocarbon cuts of the gas oil type in order, among other points, to improve their flow properties.

The treated hydrocarbon cuts according to the process of the invention are gas oils, the boiling point of which is between an initial temperature of about 150° C. and a final temperature usually fixed at 450° C. which, however, can reach 530° C. when operating under vacuum.

In order to be sold, the gas oil cuts must comply with commercial specifications for motor gas oils and domestic fuels. With regard to their manufacture, the strictest specifications are the maximum sulphur content and the flow characteristics. The flow characteristics most often used for gas oils are the pour and cloud points as defined in the French Standard AFNOR T 60.105 and the filtration temperature limit, normally designated by FTL as defined by the French Standard AFNOR N. 07.042 equivalent to Bristish Standard IP 309 cold filter clogging point (designated CFCP). In general, the gas oil cuts from straight run distillation must be submitted to different appropriate treatments to comply with the specifications.

The gas oils from straight run distillation having a high sulphur content normally undergo a desulphurization treatment. These treatments are conventionally applied in the presence of hydrogen, i.e., hydrosulphurization (HDS) with a cobalt-molybdenum based catalyst supported on alumina.

Until now, two kinds of solutions have been proposed in order to obtain gas oils conforming to the flow specifications. The first solution consists in adding to the gas oils additives which lower only their flow point and their filtration temperature limit.

The second solution consists in submitting them to a catalytic treatment in the presence of hydrogen.

Since in fact, it is generally admitted that the flow problems are due to the presence in the gas oil of relatively long n-paraffin chains, the aim of the catalytic treatments is to eliminate these n-paraffins. In order to achieve this aim, two methods have been proposed e.g., on the one hand, a selective cracking process and on the other hand an isomerization process.

The processes of the first kind generally use catalysts derived from those used in the hydrodesulphurization. J. E. MARECHAL'S study "Communication to the 6th Petroleum Congress—Section III Paper I PD 7" well emphasizes the technical point of these methods which up until now have hardly been evolved.

These catalysts comprise the association of a metal from the VI B group of the Periodic Classification of Elements, tungsten or molybdenum particularly, and a metal from the iron group, usually cobalt or nickel, placed on a support, the acidity of which is sufficient to allow a moderate cracking of the heavy n-paraffins.

In order that the methods of this kind be efficient i.e., that the catalyst used be active and stable, it is necessary that it be used in severe conditions, particularly with respect to the pressure level which must reach 50 bars and more, for example.

These operating conditions do not render it possible to obtain gas oil in sufficient yields to render such a process attractive although it is possible to obtain, in the same unit, the desulphurization and the flow property improvement of the gas oil.

As a corollary, due to the hydrocracking reaction which occurs, the hydrogen consumption of these processes is high and often prohibitively expensive.

The processes of the second kind are generally used with catalysts derived from those used for the isomerization of light gasolines and comprise a noble metal such as platinum or palladium sometimes associated with another metal from group VIII such as rhenium, on a support having a slight isomeration activity. The supports used are, for example, zeolites, alumina, silica-alumina etc. When these supports do not themselves contain a sufficient acidity (as in the case of alumina), such acidity is obtained by the addition of a halogen to the support and/or to the feed.

This second kind of process however had certain objectionable features. In fact, the catalysts used are often sensitive to sulphur which can quickly render them inactive. Generally, these processes are thus used with desulphurized gas oils. Moreover, it is necessary, in order to obtain good stability of the catalyst, to operate at a high pressure above 35 bars and often as high as 50 bars.

The present invention is directed to a catalytic process for the treatment of gas oils in order to improve their flow properties without the aforementioned disadvantages. The catalytic process of the present invention, used in the presence of hydrogen, is, in fact, only slightly sensitive to the sulphur contained in the feed, it renders possible, even at least partially, the desulphurization of said feed and is stable in the operating conditions under low pressure and especially similar to the one used in hydrodesulphurization. The present process allows the obtention, in the course of tests conducted for several weeks, of substantial improvements of the flow properties as well as of high gas oil yields, with moderate hydrogen consumption.

The present invention is directed to a catalytic process treatment, in the presence of hydrogen, of a feed comprising a gas oil hydrocarbon cut of the gas oil type characterized in that said feed is treated at a temperature of between 400° and 550° C., under a total pressure of between 18 and 60 bars in the presence of a catalyst having, by weight, a platinum content of 0.1 to 1% and an iridium content of 0.01 to 1%, these two metals being incorporated on an alumina support having a specific surface of more than 50 m$^2$/g, a silica content less than 10% and a halogen content less than 0.1%.

The proportions mentioned in the present description and claims, unless otherwise specified, are expressed in weight percentage.

The catalyst used in the process of the invention is thus constituted of the association of the two active metals, platinum on the one hand and the iridium on the other hand, the said metals being incorporated on an alumina support.

The platinum content of the catalyst is between 0.1 and 1% by weight. However, due to the high activity of platinum, its content in the catalyst will be generally lower, and is, for example, between 0.2 and 0.6% by weight.

The occurrence alongside platinum of a second promotor metal e.g. iridium, gives the catalyst on one hand an improved activity and on the other, a much longer service time or catalyst life.

The content of the second metal in the catalyst is between 0.01 and 1% by weight. It must be noted however, surprisingly, that the improvement of the activity and stability properties of the catalyst appears as soon as low iridium contents, for example 0.01% by weight, are attained.

Beyond these small contents of promotors, the improvement observed in activity and stability is noticeable despite its much more limited extent. The iridium content will thus generally be between 0.01 and 0.2% by weight.

The active metals of the catalyst are incorporated on an alumina support having a large specific surface and not having been previously subjected to a special treatment with a view to obtain the desired acidity.

This alumina has a specific surface higher than 50 m²/g and is preferably comprised between 100 and 400 m²/g. The alumina used has on the one hand a silica content lower than 10% by weight and preferably, lower than 2% and on the other hand, a halogen content, particularly chlorine or fluorine, lower than 0.1%.

The active metals are generally incorporated on the support by impregnating with solutions of said metal compounds. The compounds generally used are chlorine compounds such as hexachloroplatinic acid ($H_2PtCl_6$), hexachloroiridic acid ($H_2IrCl_6$) or a complex salt such as $[(NH_3)_4Pt]Cl_4$, or the diaminodinitroplatinum complex.

When chlorine compounds are used for impregnating the support, as is most often the case, the chlorine thus added to the support remains fixed there at least partially despite the subsequent calcination and reduction treatments. The final catalyst will thus be able to contain significant quantities of halogen, chlorine in the circumstances, inherent to the impregnation method used, although the initial support was completely devoid of them.

The quantity of halogen thus added would vary according to the compound used. The maximum halogen content of the final catalyst can be estimated at 2% by weight.

The process of the invention enables an improvement in the flow qualities of the gas oils without it being necessary to desulfurize them beforehand. Operating conditions are as follows:

The temperature is between 400° and 550° C. and more often between 420° and 500° C.

The liquid space velocity of LSHV expressed in $m^3/m^3/h^{-1}$ is generally between 0.3 and $3h^{-1}$.

These two operating conditions are those which are currently used in the known process of the prior art.

The total pressure prevailing in the reaction zone is generally between 18 and 60 bars and preferably between 18 and 32 bars.

This pressure, which is lower than that which is normally used in the prior art, is permitted by the remarkable stability properties of the catalysts of the invention. It is, in fact, conventional, to increase the pressure used in a process to obviate the instability of a catalyst.

The use of a low pressure offers the advantage of enabling the incorporation of the catalysts of the invention in industrial hydro desulphurization units. A second advantage of the use of low pressures is that the liquid yield of improved gas oils is raised, which thus corresponds also to a low hydrogen consumption.

The hydrogen/hydrocarbon molar ratio is in general between 2 and 8.

On the other hand, it may be noted that the catalysts used in the process of the invention are not only compatible with the pressure conditions and LSHV of a conventional hydro desulphurization, but have, besides, a desulphurization activity per se, which thus renders possible, when the standard process of hydro desulphurization is associated with that of the invention, to greatly reduce the required quantity of hydro desulphurization catalyst and also furthermore, the corresponding reactor volume.

In fact, it has been observed that the process of the invention also leads to the production of hydrogen sulphide. This seems to suggest that the action of the metallic parts of the catalyst is merely of the sulfur type rather than the metallic type.

The process of the invention will be better understood in the light of the following examples which are given only as illustrations.

In the examples which follow, two different gas oils were tested. The characteristics of these gas oils are given in table I below:

TABLE I

|  | Gas oil A | Gas oil B |
| --- | --- | --- |
| Density at 20° C. | 0.8463 | 0.839 |
| Sulphur (% weight) | 1.22 | 1.03 |
| FTL (1) °C. | +1 | −1 |
| CP (1) °C. | +4 | +2 |
| Distillation ASTM |  |  |
| IP °C. | 197 | 170 |
| 5% | 229 | 206 |
| 50% °C. | 287 | 272 |
| 95% | 378 | 425 |
| FP | 390 | 442 |

(1) FTL = Filtration temperature limit  CP = Cloud point  IP = Initial distillation point  FP = Final distillation point

EXAMPLE I

In this example gas oil B, as defined below, is treated in the following operating conditions:
Total pressure: 30 bars
Hydrogen/hydrocarbon molar ratio: 4
Space velocity (liquid): 1 $h^{-1}$
with different catalysts, the composition of which is given below, while varying the applied temperature between 390° and 450° C.

The catalysts used in this example have been prepared through dry impregnation of γ-alumina having a large specific surface (250 m²/g) with the following solutions:
hexachloroplatinic acid (catalysts 1 and 5)
hexachloroplatinic acid + hexachloiridic acid (catalysts 2 and 3)
hexachloroplatinic acid + rhenium chloride (catalysts 4 and 6), these two catalysts being given as a comparison.

The quantities of salts used were chosen such that the catalysts contain, respectively (by weight):
catalyst 1: 0.3% Pt
catalyst 2: 0.3% Pt, 0.3% Ir
catalyst 3: 0.3% Pt, 0.02% Ir
catalyst 4: 0.3% Pt, 0.3% Re
catalyst 5: 0.6% Pt
catalyst 6: 0.3% Pt, 0.02% Re For all these catalysts, the impregnation was followed by calcination at 540° C. and hydrogen reduction at 540° C.

The obtained results give the variation of the filtration temperature limit (Δ FTL) and the variation of the cloud point (Δ CP)(expressed in °C.). They are listed in table II below in function of the duration of the test (or running time) and the temperature of the reaction.

The study of the preceding table shows that the utilization of a platinum on alumina catalyst, the flow properties of the treated gas oil fairly substantially, while the addition of a metallic promotor such as iridium, greatly improves the activity of the catalyst even if the quantity of iridium added is small (catalyst 3).

Stability is also improved although this improvement does not completely appear in the table probably due to the limited duration of the tests.

TABLE II

| Catalyst n° | Running time (Hours) | Temperature (°C.) | Δ FTL (°C.) | Δ CP (°C.) |
|---|---|---|---|---|
|   | 24 | 390 | 2 | 1 |
|   | 48 | 420 | 7 | 6 |
| 1 | 72 | 450 | 18 | 18 |
|   | 96 | 420 | 6 | 5 |
|   | 24 | 390 | 6 | 5 |
|   | 48 | 420 | 13 | 13 |
| 2 | 72 | 450 | 25 | 25 |
|   | 96 | 420 | 12 | 13 |
|   | 24 | 390 | 5 | 4 |
|   | 48 | 420 | 11 | 11 |
| 3 | 72 | 450 | 21 | 20 |
|   | 96 | 420 | 10 | 11 |
|   | 24 | 390 | 3 | 3 |
|   | 48 | 420 | 9 | 10 |
| 4 | 72 | 450 | 20 | 21 |
|   | 96 | 420 | 8 | 10 |
|   | 24 | 390 | 1 | 2 |
|   | 48 | 420 | 7 | 6 |
| 5 | 72 | 450 | 18 | 17 |
|   | 96 | 420 | 6 | 6 |
|   | 24 | 390 | 2 | 1 |
|   | 48 | 420 | 7 | 6 |
| 6 | 72 | 450 | 18 | 18 |
|   | 96 | 420 | 6 | 5 |

The addition of rhenium to the catalyst renders possible an improvement of the flow properties of the gas oils if said addition is made in relatively large quantities [0.3% Re(cat3)]. On the other hand, this improvement disappears when rhenium is added in small quantities [0.02%(cat.6)].

EXAMPLE 2

This example given, by way of comparison, is designed to show that if a given acidity through the addition of chlorine is fixed on the alumina support, a very active catalyst with respect to the process of the invention is obtained, this catalyst being, however, instable and slightly selective.

The catalyst of the preceding example is subjected to the following treatment: hydrogen reduction at 540° C. followed by chlorination through injection of $CCl_4$ at 400° C. then 0.2% by weight of chlorine (catalyst 1 A) is added to the catalyst. This catalyst and the catalyst of the preceding example were tested in the same conditions.

The chlorine content of catalyst A is 0.45% by weight; that of catalyst 1 is 0.25% by weight.

These two catalysts are used for treating gas oil A previously defined in the following operating conditions:
Pressure: 30 bars
hydrogen/hydrocarbon molar ratio: 4
LSHV:1 $H^{-1}$ during the test on catalyst 1 A, 100 ppm of chlorine in the form of $CCl_4$ are added to the treated feed stock.

The results obtained are given in table III below in function of the running time and the temperature of the reaction.

TABLE III

| Running time (Hours) | Temperature °C. | Catalyst 1 A Yield in gasoline (% weight) | FTL °C. | CP °C. | Catalyst Yield in gasoline (% weight) | FTL °C. | CP °C. |
|---|---|---|---|---|---|---|---|
| 0 |   |   | +1 | +4 |   | +1 | +4 |
| 24 | 390 | 4.2 | +1 | +4 | 1 | +1 | +4 |
| 48 | 420 | 16 | −15 | −12 | 2.2 | +1 | +2 |
| 72 | 450 | 24 | −12 | −8 | 10 | −11 | −7 |
| 96 | 420 | 10 | −3 | 0 | 3 | −2 | −4 |

The yield in gasoline indicated in table III corresponds to the fraction of petroleum (C 5-171 TBP) obtained with regard to the gas oil introduced. It is seen that the presence of chlorine on the catalyst, even in proportions lower than those which are often used in the previous art, clearly improves the activity of the catalyst during the first forty-eight hours of working. The cracking is also increased for an similar variation of FTL, which might be bad for the hydrogen consumption since it implies a big increase in the yield in gasoline. Finally, it may be noted that readjusting the temperature back to 420° C. after 96 hours does not render it possible to restore the excellent initial activity (at 420° C.); this thus shows that the catalyst is unstable. This instability is even greater as the quantity of chlorine added increases. In fact, if 0.4% by weight of chlorine is added to the catalyst an even greater activity may be observed but the reactor is completely clogged at the end of 100 hours running time due to substantial coke formation.

EXAMPLE 3

In this example, the method described in Example I was used to prepare three catalysts containing 0.3% by weight of platine from three different γ-alumina, the characteristics of which are the following:

| Specific surface (m²/g) | Content in $Na_2O$ (% weight) | $SiO_2$ (% weight) | $SO_4$ (% weight) | Structure |
|---|---|---|---|---|
| Alumina 1:250 | 0.001 | 0.005 | 0.06 | extrud 1.5 mm |
| Alumina 2:230 | 0.1 | 1.4 | 1.5 | extrud 3 mm |
| Alumina 3:10 | 0.05 | 0.35 | <0.01 | ball 2 mm |

The catalysts thus obtained are tested under a total pressure of 30 bars with a hydrogen/hydrocarbon molar ratio equal to 4 and a LSHV equal to 1. The results obtained are shown in table IV below, the feed stock used being constituted of gas oil B.

Table IV shows that the main quality of alumina used in the process of the invention is the specific surface rather than its degree of purity. In fact, it can be observed that the improvement in the flow qualities is clearly lower with alumina three having a small specific surface. It must be equally noted that for a similar drop in filtration temperature limit, the gasoline yield obtained with alumina 3 much greater, this thus confirms the interest of a reaction temperature as low as possible.

TABLE IV

| Catalyst | Running time (Hours) | Temperature (°C.) | Δ FTL (°C.) | Δ CP (°C.) | Yield in gasoline by weight |
|---|---|---|---|---|---|
| 0.3% | 24 | 390 | 2 | 1 | 1 |
| Platinum | 48 | 420 | 7 | 6 | 4.5 |
| + alumina 1 | 72 | 450 | 18 | 18 | 11.5 |
| 0.3% | 24 | 390 | 2 | 1 | 1 |
| Platinum | 48 | 420 | 7 | 5 | 4.5 |
| + alumina 2 | 72 | 450 | 16 | 17 | 10.5 |
| 0.3% | 24 | 390 | 2 | 0 | 3 |
| Platinum | 48 | 420 | 2 | 1 | 3 |
| + alumina 3 | 72 | 450 | 7 | 6 | 12 |

EXAMPLE 4

In this example, catalysts 1 to 3 described in Example I were subjected to a long duration, continuous operating test.

The treated feed is constituted of gas oil A previously defined.

Operating conditions are the following:
Total pressure: 30 bars
Reaction temperature: 450° C.
Hydrogen/hydrocarbon molar ratio: 4
LSHV: 1 h$^{-1}$ The obtained results are given in table V below in which the duration or running time is expressed in days and the flow properties are defined by variation of filtration temperature limit (Δ FTL) and of the turbidity point (Δ CP).

The analysis of table V shows that catalyst 1, formed of platinum on alumina, results in a significant improvement of the flow properties on a one months' duration test despite the presence in the feed stock of sulphur to which the catalysts are deemed sensitive. It even enables a considerable desulphurization of the feed, decreasing with the variation of performances, and the yield in gas oil conserves its excellent level.

The results obtained with the catalysts comprising alongside platinum on metallic promotor, consisting in iridium, show that these latter catalysts provide a considerable improvement in performances, especially with respect to stability in addition; it must also be noted that these bimetallic catalysts also keep their desulphurizing activity much longer.

EXAMPLE 5

In this example, gas oil A was treated in the presence of catalyst no. 2 to which was added a quantity of a conventional desulphurization catalyst consisting of cobalt-molybdenum deposited on alumina and constituting 20% by weight of the catalyst 2.

The desulphurization catalyst had been placed during two successive days in the reactor top then in the reactor bottom.

TABLE V

| Catalyst n° | Running time (days) | ΔFTL (°C.) | ΔCP (°C.) | Yield in gas oil % weight | % Gas produced C$_1$—C$_4$ (weight) | % Gasoline produced (weight) | % Sulphur in the gas oil (weight) |
|---|---|---|---|---|---|---|---|
| 1 | 7 | 6 | 6.5 | 94 | 1 | 5 | 0.31 |
|   | 14 | 5.5 | 5 | 94 | 1 | 5 | 0.43 |
|   | 21 | 4 | 4 | 94 | 1 | 5 | 0.54 |
|   | 28 | 3 | 2.5 | 94.2 | 1 | 4.8 | 0.66 |
| 2 | 7 | 6.5 | 6 | 94.5 | 1 | 4.5 | 0.3 |
|   | 21 | 5.5 | 6 | 94.5 | 1 | 4.5 | 0.39 |
|   | 28 | 4.8 | 5 | 94.5 | 1 | 4.5 | 0.42 |
|   | 35 | 4.5 | 4.8 | 94.5 | 1 | 4.5 | 0.46 |
|   | 42 | 4 | 4 | 94.5 | 1 | 4.5 | 0.48 |
|   | 49 | 3.5 | 3 | 94.5 | 1 | 4.5 | 0.50 |
| 3 | 7 | 7 | 6 | 95 | 1 | 4 | 0.3 |
|   | 21 | 6 | 7 | 95 | 1 | 4 | 0.4 |
|   | 28 | 4.5 | 5 | 95 | 1 | 4 | 0.41 |
|   | 35 | 4.5 | 5 | 95 | 1 | 4 | 0.46 |
|   | 42 | 4 | 5 | 95 | 1 | 4 | 0.47 |
|   | 49 | 4 | 3 | 95 | 1 | 4 | 0.49 |

Operating conditions are those described in Example 4.

After 96 hours of testing, it was noted that the improvements in flow qualities are similar to those observed in Example I and that the gas oil desulphurization rate reached 90% by weight wherever the desulphurizing catalyst is placed.

What is claimed is:

1. A process for the catalytic treatment in the presence of hydrogen of a gas oil type hydrocarbon which comprises: contacting said hydrocarbon with hydrogen at a temperature between 400° and 550° C. under a total pressure of between 18 and 60 bars in the presence of a catalyst consisting essentially of by weight between 0.1 to 1% of platinum and 0.01 to 1% of iridium, on an alumina support having a specific surface area higher than 50 m$^2$/g, a silica content lower than 10% by weight and a halogen content lower than 0.1% by weight.

2. A process according to claim 1 wherein the alumina support of the catalyst has a specific surface between 100 and 400 m$^2$/g and a silica content lower than 2% by weight.

3. A process according to claims 1 or 2 wherein the catalyst has a platinum content between 0.1 and 0.6% by weight and an iridium content between 0.01 and 0.2% by weight.

4. A process according to claim 1 or 2 wherein the catalyst has a halogen content lower than 2% by weight.

5. A process according to claim 1 or 2 wherein the total pressure is between 18 and 32 bars.

6. A process according to claim 1 or 2 wherein the hydrogen/hydrocarbon molar ratio comprised between 2 and 8.

7. A process according to claim 1 wherein the reaction temperature is between 420° and 500° C. and the liquid hourly space velocity is between 0.3 and 3 h$^{-1}$.

8. A process according to claim 6 wherein the reaction temperature is between 420° and 500° C. and the liquid hourly space velocity is between 0.3 and 3 h$^{-1}$.

* * * * *